United States Patent [19]

Cragel

[11] Patent Number: 4,806,023
[45] Date of Patent: Feb. 21, 1989

[54] COMPLIANT HYDRODYNAMIC GAS BEARING

[75] Inventor: Daniel F. Cragel, Northville, Mich.

[73] Assignee: Williams International Corporation, Walled Lake, Mich.

[21] Appl. No.: 200,251

[22] Filed: May 31, 1988

[51] Int. Cl.⁴ ............................................ F16C 17/02
[52] U.S. Cl. .................................................... 384/106
[58] Field of Search ............... 384/106, 103, 104, 105, 384/119, 215

[56] References Cited

U.S. PATENT DOCUMENTS

| | | | |
|---|---|---|---|
| 4,195,395 | 4/1980 | Silver et al. | 384/106 |
| 4,549,821 | 10/1985 | Kawakami | 384/103 |
| 4,552,466 | 11/1985 | Warren | 384/106 |
| 4,767,222 | 8/1988 | Paletta et al. | 384/106 |

*Primary Examiner*—Lenard A. Footland
*Attorney, Agent, or Firm*—Lyman R. Lyon

[57] ABSTRACT

A spring support and Coulomb damping system for a compliant hydrodynamic gas lubricated bearing comprises a plurality of cylindrical spring elements arranged in a circumferential and axially aligned array for the support of a flexible foil.

2 Claims, 1 Drawing Sheet

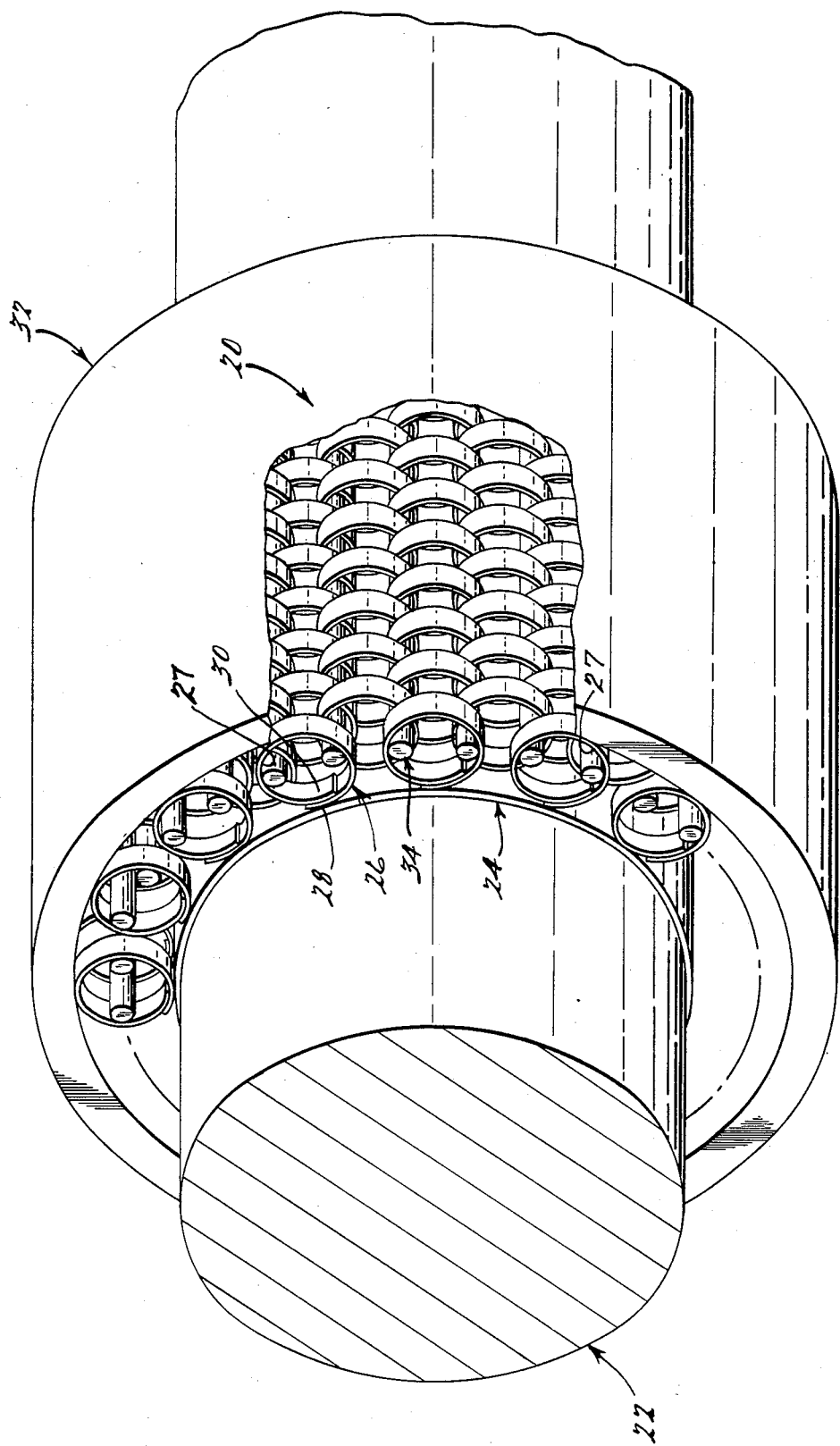

COMPLIANT HYDRODYNAMIC GAS BEARING

BACKGROUND OF THE INVENTION

Compliant hydrodynamic gas bearings are ideally suited to conditions found in aircraft turbine engines since they are not subject to the operational and durability limitations characteristic of bearings which require complex lubricant, support, cooling, and sealing systems. However, there is a need for improvement in the control of spring rate of the foil support system to insure dynamic stability of the rotor-bearing system at all speeds.

One difficulty experienced in known compliant hydrodynamic gas bearings has been that the foils are required to be relatively stiff in order to achieve a desired spring rate. Unless the foil in known systems is stiff the bearing system exhibits an inability to control oscillatory motion between the movable and stationary members at certain critical bearing speeds resulting in reduced load-bearing capacity. In contradistinction, it is desirable to minimize stiffness of the foil in order to render it sufficiently compliant to conform uniformly to the shaft under all conditions.

Another problem relates to oscillation under load conditions. The shaft in a high-speed radial bearing tends to orbit about the geometric center of the bearing support and the amplitude of the oscillation is maximized at certain critical speeds. In order to control this oscillation, it is desirable to introduce friction into the system. Friction introduced into an air bearing system is of two types, namely, viscous damping and sliding, or Coulomb, friction. The relatively small viscous-damping forces are linearly related to velocity while the predominant friction forces are due to sliding, or Coulomb, friction. Thus, it is preferable to maximize Coulomb damping in the bearing assembly.

SUMMARY OF THE INVENTION

The present invention relates to a foil support system that utilizes a plurality of circular springs to achieve a desired spring rate and to maximize Coulomb damping. The spring geometry provides the desired spring rate with minimum circumferential growth.

More specifically, the spring and Coulomb dampening system of the invention comprises a plurality of circular spring elements with overlapping end portions. The circular spring geometry allows for ease of assembly and simplified retention, yet permits each spring to act independently of the adjacent spring, or under uniform loading, to combine properties.

BRIEF DESCRIPTION OF THE DRAWINGS

FIG. 1 is a perspective view, partially broken away, of a spring and Coulomb dampening system for a compliant hydrodynamic gas lubricated bearing in accordance with the instant invention.

DETAILED DESCRIPTION OF THE PREFERRED EMBODIMENT OF THE INVENTION

Referring to the drawing, a compliant hydrodynamic gas bearing 20 in accordance with a preferred embodiment of the present invention is shown disposed about a shaft 22. A flexible compliant foil 24 is supported by a plurality of like circular spring elements 26 disposed in a plurality of circumferential arrays. The spring elements 26 of adjacent circumferential arrays are overlapped to define arcuate axially aligned segments 27 therein, respectively. Opposite end portions 28 and 30 of each spring element 26 overlap at the point of contact with the foil 24 so as to provide multipoint, relatively slidable support for the foil 24 to maximize Coulomb damping. The spring elements 26 are contained in the aforesaid circumferential array by a bearing sleeve 32 which is accepted in a complementary bearing support (not shown).

In accordance with one feature of the invention, the spring elements 26 are retained in their circumferential array by a plurality of axially extending link rods 34 that are mechanically trapped between the arcuate overlapping segments 27 of the axially and circumferentially arrayed springs 26. Thus, each spring element 26 is free to radially contract or expand independently, without significant or transmitted circumferential growth.

It is to be noted that each spring element 26 serves two functions, namely, (a) to provide localized contour stiffness to the foil 24 to prevent unwanted undulations in the hydrodynamic fluid-film thereunder that would decrease the load carrying capacity of the bearing and (b) to provide the primary Coulomb damping function exhibited by the bearing under oscillatory loads. This damping occurs between the opposed contact surfaces on the ends 28 and 30 of each spring 26 and between each spring 26 and the mating surface of the foil 24. Since damping is directly related to the coefficient of friction between relatively slidable surfaces, surface treatment of one or both members can be utilized to fine tune the damping characteristics.

The spring elements 26 unilaterally comprise a compliant support system which optimizes (a) the hydrodynamic fluid film and load-carrying capacity thereof, (b) bearing damping capability, (c) staged increase in stiffness with increasing load on the foil 24, and (d) the capability of withstanding misalignment between the foil 24 and the bearing sleeve 32.

In operation, rotation of the shaft 22 relative to the foil 24 induces the formation of a boundary layer of gas in a converging wedge-shaped gap between the shaft surface and the bearing suface of the foil 24. The converging wedge-shaped gas layer is inherently formed under the foil 24 of the bearing 20 due to unavoidable eccentricities in the system, for example eccentricity of the shaft axis relative to the journal axis.

The spring elements 26 directly accomodate both radial and circumferential deflection of the foil 24 in accordance with the pressure profile of the hydrodynamic gas film so as to provide maximum load carrying capacity, to tolerate bearing misalignments and skew loads, and to tolerate thermal distortion. Load carrying capacity is further enhanced by the geometry of the spring elements 26 which provide an initial soft layer of support that rapidly and progressively becomes stiffer in the radial direction without substantial radial growth.

Under misaligned or skewed load conditions, substantial deflection of one edge of the bearing assembly 20 may occur in a direction parallel the axis of the shaft 22. Such lateral deflection between the shaft 22 and the stationary sleeve 32 is individually compensated by the spring elements 26. The spring constant of the spring elements 26 provides the means to tailor resistance to lateral deflection of the bearing 20 thereby to tolerate bearing misalignment and skew loads. In addition, multipoint support of the foil 24 insures that the clearance space between the shaft 22 and the foil 24 at the two ends of the bearing 10 remains substantially uniform across the journal surface of the shaft 20 within the constraints imposed by the pressure profile of the hydrodynamic gas fluid-film. It also enables the pressure profile across the foil 24 to be relatively uniform since the bearing clearance is relatively uniform, thereby minimizing any reduction in load capacity of the bearing due to pressure variations. In addition, heat generated in the fluid film and transferred to the foil 24 is relatively efficiently dissipated by large surface area of the springs 26, preventing localized heat distortion of the foil 24.

While the preferred embodiment of the invention has been disclosed, it should be appreciated that the invention is susceptible of modification without departing from the scope of the following claims.

I claim:

1. A foil support and Couloumb damping system for a compliant hydrodynamic gas bearing comprising a plurality of discrete circular springs arranged in a plurality of axially stacked circumferential arrays with the central axes thereof in parallel relationship, each of said springs having overlapping end portions, adjacent circumferential arrays of said springs being circumferentially displaced relative to one another so as to define two diametrically related overlapping retainer segments on each of said springs, respectively, a plurality of spring retainer rods extending axially through the overlapping retainer segments of each of said springs for retaining said springs in said circumferential and axially stacked array, and a flexible foil disposed radially inwardly of said springs and directly supported thereby.

2. A foil support system in accordance with claim 1 wherein the point of engagement between said springs and said foil directly underlies the overlapping end portions of said springs.

* * * * *